United States Patent [19]

Glässel et al.

[11] Patent Number: 5,143,575
[45] Date of Patent: Sep. 1, 1992

[54] SPIRAL WOUND FILTER AND METHOD OF MAKING SAME

[75] Inventors: Horst Glässel, Schwabach; Reinhard Jaus, Nürnberg; Egbert Hellwig, Feucht, all of Fed. Rep. of Germany

[73] Assignee: Robert Bosch GmbH, Stuttgart, Fed. Rep. of Germany

[21] Appl. No.: 671,893

[22] PCT Filed: Aug. 22, 1989

[86] PCT No.: PCT/DE89/00544
§ 371 Date: Mar. 8, 1991
§ 102(e) Date: Mar. 8, 1991

[87] PCT Pub. No.: WO90/05009
PCT Pub. Date: May 17, 1990

[30] Foreign Application Priority Data

Nov. 4, 1988 [DE] Fed. Rep. of Germany ....... 3837423

[51] Int. Cl.$^5$ ............................................. B01D 27/08
[52] U.S. Cl. ................................... 156/309.9; 210/232; 210/309; 210/312; 210/316; 210/439; 210/440; 210/446; 210/455; 210/493.2; 210/497.1
[58] Field of Search ............... 210/232, 307, 309, 312, 210/316, 439, 440, 446, 455, 493.2, 493.4, 494.1, 497.1; 156/69, 308.4, 309.9, 322; 55/498, 520

[56] References Cited

U.S. PATENT DOCUMENTS 3,265,213 8/1966 Decker ............................... 210/136
4,056,876 11/1977 Lämmermann ....................... 156/69

FOREIGN PATENT DOCUMENTS 99472 2/1984 European Pat. Off. .
3513062 10/1986 Fed. Rep. of Germany .
2266535 10/1975 France ........................... 210/493.2
2598936 11/1987 France .
1446918 8/1976 United Kingdom .

Primary Examiner—Robert A. Dawson
Assistant Examiner—Matthew O. Savage
Attorney, Agent, or Firm—Michael J. Striker

[57] ABSTRACT

The fluid filter (10) for fuel has a wound filter element (17) arranged in the housing (11) surrounded on its bottom end face (22) by a funnel-shaped welded-on cover cap (18). The cover cap (18) made of thermoplastic has an annular welding surface (25) which extends perpendicularly relative to the longitudinal axis of the filter and which is welded at least to the outermost complete turn (29) of the winding (17). An adhesive-free connection (32) between the wound filter element (17) and housing (11) thereby is formed. The preassembled wound filter element (17, 18) which can be handled easily is suitable for cold assembly on universal production lines and for different models.

14 Claims, 3 Drawing Sheets

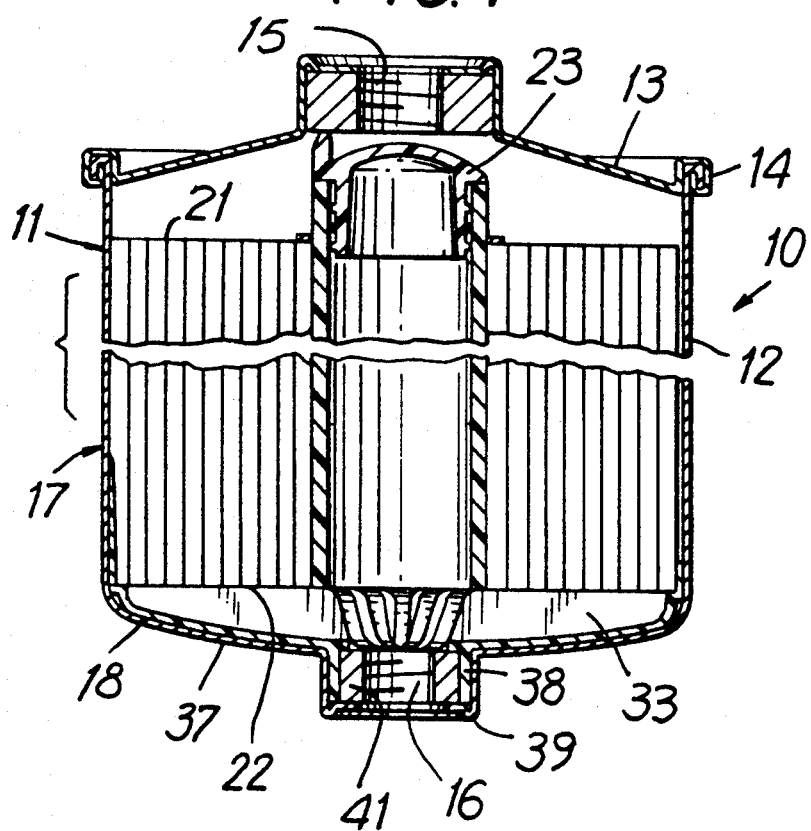
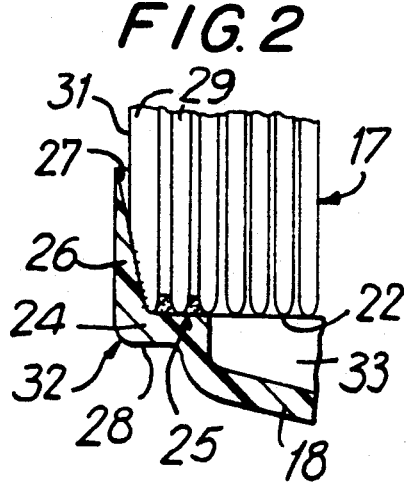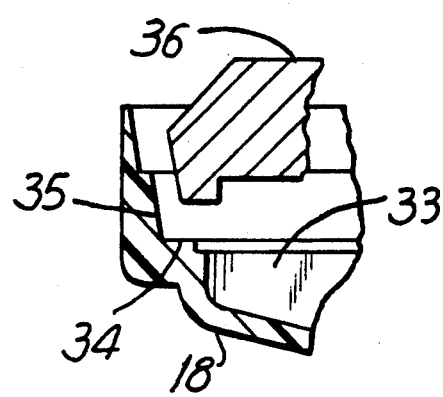

SPIRAL WOUND FILTER AND METHOD OF MAKING SAME

BACKGROUND OF THE INVENTION

The invention relates to a fluid filter for a fuel.

A known fuel filter includes a housing having at least one inlet connector and at least one outlet connector for a fluid to be filtered, a middle tube located in the housing, a filter element arranged in the housing, the filter element consisting of a band-shaped filter material wound spirally around the middle tube to form a plurality of complete turns including an outermost complete turn, opposing end faces of the filter element on opposite ends thereof and spaces between the turns, which open towards the opposite end faces and which communicate with the connectors, and a bottom cover cap which engages the filter element.

Such a fluid filter is already known from WO-A1 0, 081, 597, especially FIG. 2. In this fuel filter a wound filter element is arranged in a housing and has a funnel-shaped cover cap on its bottom end face on the clean side of the fuel filter. This cover cap deflects the purified fluid flow coming out of the end face into the middle tube. At the same time, inwardly pressed radial ribs supporting the filter element are arranged in the cover cap. A disadvantage of this fluid filter is that this cover cap consists of metal and has a sleeve-shaped edge portion which is widened in a funnel-shaped manner and into which the wound filter element is simply pressed with its outer surface. By this simple pressing of the filter element into the cover cap, a serviceable sealing between the dirty side and clean side of the filter can be achieved, in the region of the compressed outer surface, only with oils having substantially higher viscosities than petrol or diesel fuels. Moreover, when the filter element is being pressed in, the outer layers of the winding usually consisting of paper are excessively compressed or even damaged. Furthermore, the metal cover cap necessitates an increased outlay in terms of material and machining. Besides, the distance between the cover cap and the bottom of the housing not only results in a poor utilisation of space, but is also unsuitable for different models in which an additional connection has to be provided at the bottom of the housing. In addition, because of the assembly of a large number of individual parts, the construction of the filter is cost-intensive.

Further, German Patent Specification 3,513,062 makes known a fluid filter, in the housing of which a wound filter element is arranged with the help of a cover cap. Here, the wound filter element and the cover cap are already appropriately preassembled with one another in a fluid-tight manner. A disadvantage, however, is that the cover cap is arranged on the upper end face of the wound filter element and this cover cap bounds with a housing lid an additional inflow space. Moreover, in this design of the cover cap a series of sealing points between the dirty side and clean side are necessary. At the same time, one of these sealing points between the cylindrical outer surface of the wound filter element and an associated cylindrical inner wall at a tubular extension of the cover cap can be produced only with difficulty, especially as there is no axial fixing of these two parts relative to one another. Besides, an additional adhesive bond is required between the filter insert and filter housing to separate the dirty side and clean side.

Further, German Patent Specification 2,256,995 makes known a fluid filter with a wound filter element, in which the prefabricated filter element is bedded into the bottom-shaped housing lower part. Here, the prefabricated filter element possesses, on its cylindrical outer surface, a preformed annular bead of hot-melt adhesive which is oversized in relation to the inner wall of the housing and which, when the wound filter element is pressed into a heated housing part, melts in its outer edge zone and, after solidifying, makes a firm sealing connection between the dirty side and clean side. But it can be a disadvantage that this connection between the filter winding and housing is possible only by an adhesive. For a perfect connection, the bowl-shaped housing part must be cleaned so as to be absolutely free of grease before the wound filter element is bedded in, thereby increasing the production outlay. During any intermediate storage of the filter element, its two end faces are exposed without protection to contamination.

SUMMARY OF THE INVENTION

According to the invention, the bottom cover cap is made of thermoplastic and has a peripheral welding surface which extends transversely relative to the longitudinal axis of the filter, and at least the outermost complete turn of the filter element is connected sealingly to the welding surface of the cover cap. The advantage of the fluid filter according to the invention, s that it allows an adhesive-free connection between the wound filter element and the housing which makes reliable sealing possible, whilst at the same time being of relatively simple design. Here too, the filter element and the cover cap can be preassembled, with the result that it is especially suitable for mass production, in which only cold assembly is now necessary on the production line. Moreover, this adhesive-free connection is suitable for fluid filters of different models, such as, for example, a conduit filter or a box filter with or without a water outlet connection. The cover cap can be fastened to the wound filter element cost-effectively and thus leads to a storable intermediate product which can be handled easily and which is especially suitable for automatic line production. The complete housing interior is the dirty side, so that only a low washing quality is necessary for the housing. Moreover, the wound filter element is resistant to fuels with a high methanol or ethanol content.

When the cover cap is provided with a circumferential step on which the welding surface is located and the radial width of the welding surface corresponds at least to the thickness of two turns of the filter element, the quality of the connection point achieved has a high degree of reliability at a low outlay. Furthermore, the cover cap can be shaped to fit the bottom member of the housing so as to bear on a substantial portion of the bottom member, as a result of which favourably located sealing points can be obtained, in addition to a good utilization of space and increased stability. Advantageously a plurality of radial ribs can be provided in the cover cap in the same plane as the welding surface. Moreover, it becomes simpler to produce an intermediate product if a suitable exterior surface is provided on the cover cap. It is extremely advantageous if the wound filter element is produced in the cover cap by heated-tool welding. Advantageously, a napped, trap filter can also be incorporated.

BRIEF DESCRIPTION OF THE DRAWING

Three exemplary embodiments of the invention are illustrated in the drawing and explained in more detail in the following description.

FIG. 1 shows a longitudinal section through a first fluid filter in a simplified representation and designed as a conduit filter, FIG. 2 is a detailed cross sectional view of a connection point of the wound filter element to the cover cap according to FIG. 1, FIG. 3 is a detailed cross sectional view of a cutaway portion of the cover cap before the filter element is welded in.

DESCRIPTION OF THE EXEMPLARY EMBODIMENTS

Figure 4:
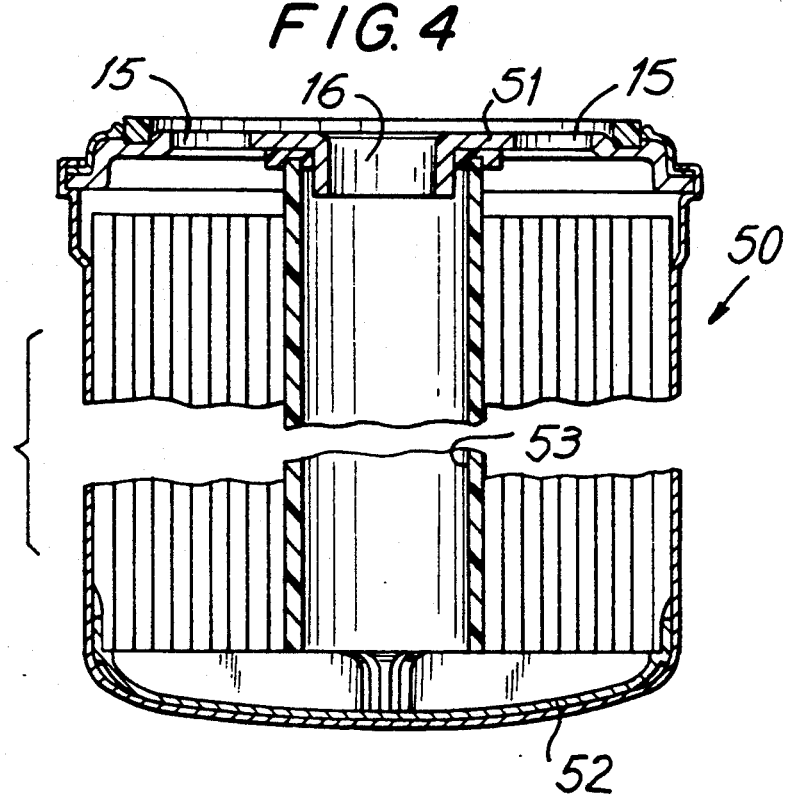
FIG. 4 shows a longitudinal section through a second fluid filter designed as a box filter.

FIG. 1 shows a first fluid filter 10, the housing 11 of which consists essentially of a bowl-shaped housing part 12 and a lid 13 which are connected sealingly and firmly to one another at a flanged point 14.

The fluid filter 10 is designed as a conduit filter, for which purpose it possesses, at opposite ends of the housing 11, two connectors 15, 16, of which the first connector 15 in the lid 13 serves as an inlet for the fluid flow, whilst the second connector 16 on the bottom of the housing part 12 is used as an outlet.

The housing 11 receives inside it a filter element 17 through which the flow passes axially and which is connected sealingly and firmly to a bottom cover cap 18. The filter element 17 consists in a way known per se of a wound web of filter material of V-shaped cross-section which is wound spirally round a middle tube 19, with an adhesive added, so that two spaces engaging in one another spirally and each being open towards one end face 21, 22 are formed in the filter element 17. The middle tube 19 is closed by a plug 23 at its end on the dirty side of the filter and therefore to the first end face 21. A closed middle tube made of plastic can also be used.

As shown in more detail in FIG. 2, between the filter element 17 and the cover cap 18 there is an adhesive-free connector, in that the two parts are welded to one another. For this purpose, the cover cap 18 consists of a thermoplastic, especially polyoxymethylene (POM). The cover cap 18 possesses in the vicinity of its outer edge, a circumferential step 24, which extends perpendicularly relative to the longitudinal axis of the fluid filter 10 and on which is formed an annular welding surface 25 facing the second end face 22 and extending essentially horizontally. The cover cap 18 merges from the circumferential step 24 into an axially extending sleeve-like peripheral portion 26 which has a conical inner wall 27. Furthermore, on the cover cap 18 an exterior surface 28 is formed on the circumferential step 24 opposite to the welding surface 25. The width of the annular welding surface 25 is preferably selected as being so large that, on the filter element 17, the paper pockets associated with the two outer complete turns 29 are fastened sealingly in the welding surface 25. Moreover, within the sleeve-shaped peripheral portion 26 a short portion of the outer surface 31 of the filter element 17 is also welded to the conical inner wall 27 of the cover cap 18. On the second end face 22 located on the clean side, the filter element 17 is supported, in the region between the welded paper pockets and the middle tube 19, on ribs 33 which here are arranged radially in the cover cap 18. The welding surface 25 and the top edges of the ribs 33 thus lie essentially in a plane extending perpendicularly relative to the longitudinal axis of the filter 10, so that the axial position of the filter element 17 relative to the cover cap 18 is fixed.

The adhesive-free connector between the filter element 17 and the cover cap 18 is made as follows, FIG. 3 being referred to in more detail. FIG. 3 shows part of the cover cap 18 before the welding operation on an enlarged scale. The cover cap 18 consisting of thermoplastic possesses, in the region of the welding surface 25 and also in the region of the inner wall, material elevations 34, 35 which are melted by means of an introduced heating punch 36. After the heating punch 36 has been pulled out of the cover cap 18, the filter element 17 is pressed into the still melted material elevations 34, 35, until its end face 22 rests on the welding surface 25 and also the ribs 33. The melted plastic, after solidifying, produces a firm sealing connector point 32. For counterpressure while the filter element 17 is being pressed in an exterior surface 28 is arranged on the cover cap 18, so that the forces arising are compensated directly in the region of the step 24. The preassembled filter element 17 can be handled easily and is especially suitable for further processing on production lines of universal use.

As FIG. 1 also shows, the shape of the cover cap 18 is so designed that it bears on a bottom member 37 of the bowl-shaped housing part 12 over a major portion of the bottom member. Furthermore, the cover cap 18 has a centrally formed tubular connector piece 38, by means of which it projects into a matching outwardly open housing connector piece 39 of the bowl-shaped housing part 12. Arranged in the plastic tubular connector piece 38 is a metal threaded nut 41 which can easily be inserted during the production of the cover cap 18 by injection molding.

During the production of the fluid filter 10, the prefabricated filter element 17 is inserted with its welded on cover cap 18 into the bowl-shaped housing part 12, and thereafter the housing part 12 is flanged with the lid 13. The unfiltered fuel supplied at the first connector 15 flows axially through the filter element 17 and at the second end face 22 passes purified over into the space of the cover cap 18 through which the ribs 33 extend, and flows further to the second connector 16. Unfiltered fuel which seeps through between the inner wall of the bowl-shaped housing part 12 and the filter element 17 cannot pass into the cover cap 18 on the clean side, since the tightening of the threaded nut 41 during the assembly of the fluid filter 10 ensures a reliable sealing between the threaded nut 41 and the housing part 12. As a result of this adhesive-free connector 32, therefore, the outlay for cleaning the housing part 12 before the preassembled filter element 17 is installed can also be kept low, especially as dirt which may infiltrate is trapped between the cover cap 18 and bottom member 37 and cannot reach the clean side in the second connector 16.

FIG. 4 shows, in simplified representation, a longitudinal section through a second fluid filter 50 which differs as follows from the first fluid filter 10 according to FIG. 1, like reference symbols being used for the same components.

The second fluid filter 50 is designed as a box filter, such as is used for fuel filtering in diesel series pumps. In it, the two connectors 15 and 16 are arranged together in the lid 51, so that there is no need for an outlet in the bottom member of the housing part 12. Correspondingly, the cover cap 52 is also designed without a central orifice and has a continuous bottom member. The unpurified fuel in flowing at the first connector 15 comes out purified on the second end face 22 of the filter element 17 and is guided by the cover cap 52 into a channel 53 of the middle tube 19 and further to the second connector 16.

Figure 5:
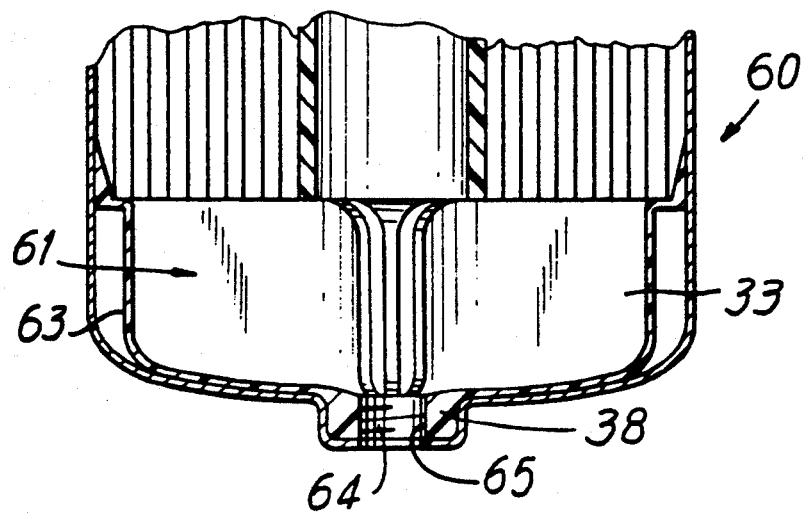
FIG. 5 shows a longitudinal section through part of a third fluid filter designed as a box filter with a water storage space.

FIG. 5 shows a longitudinal section through part of a third fluid filter 60 which differs as follows from that according to FIG. 4, like reference symbols being used for the same components. The third fluid filter 60, like the second fluid filter 50, is designed as a box filter, in which the two connectors 15, 16 are located in the lid 51, and additionally has a water storage space 61. This water storage space 61 can be obtained in a simple way by increasing the constructional length of the cover cap 62 in the axial direction by a tubular extended part 63 and by also enlarging the ribs 33 correspondingly. Moreover, the cover cap 62 has a water outlet 64, for which purpose the thread 65 for receiving a suitable water outlet screw can be arranged directly in the tubular connector piece 38 consisting of plastic.

The functioning of the third fluid filter 60, used above all for the purification of fuel for diesel distributor pumps, largely corresponds to that of the second fluid filter 50, and in addition the precipitated water can be collected in the storage space 61 and emptied via the water outlet 64.

Figure 6:
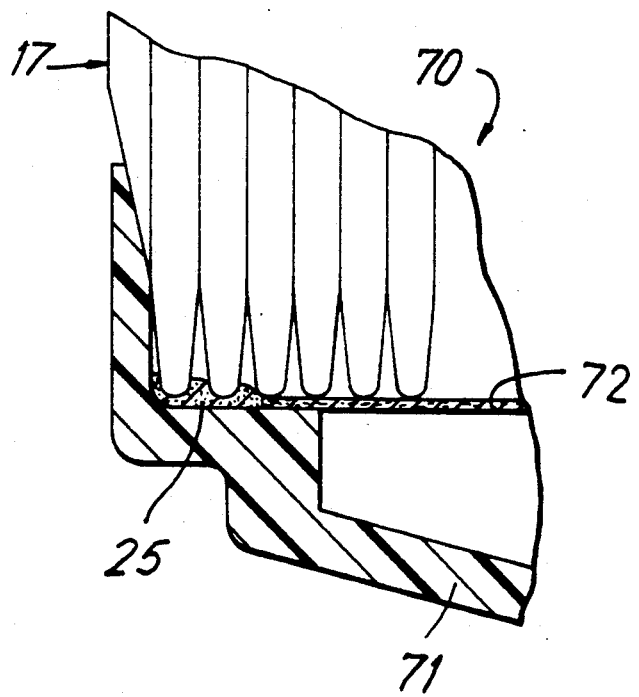
FIG. 6 is a detailed cross sectional view of a lower portion of a fourth fluid filter including the connection point of the wound element to the cover cap.

FIG. 6 shows as a detail of a fourth fluid filter 70 the connector point between the filter element and cover cap 71, the fourth fluid filter 70 differing as follows from the first fluid filter 10 according to FIG. 2, like reference symbols being used for the same parts.

In the fourth fluid filter 70, the filter element 17 is melted into the welding surface 25 in the axial direction only, so that there is no radial sealing there. This makes production easier, since the heating punch 36, when being introduced, does not have to melt any radial wall. Furthermore, the width of the step 24 and therefore of the annular welding surface 25 is selected as larger, and additionally arranged in the plane of the welding surface 25 is a napped trap filter 72 made of paper or a non-woven, which, during welding, is melted in with its outer edge in the same operation.

It is possible, of course, to make changes to the embodiments shown, without departing from the idea of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. In a fluid filter including a housing having an inlet connector and an outlet connector for a fluid to be filtered, a middle tube located in the housing, a filter element arranged in the housing, the filter element consisting of a band-shaped filter material wound spirally around the middle tube to form a plurality of complete turns including an outermost complete turn and end faces of the filter element on opposite ends thereof, and a bottom cover cap which engages the filter element in the vicinity of an adjacent one of the end faces and which connects the adjacent end face to the outlet connector, the fluid filter also having a longitudinal axis, the improvement wherein the cover cap (18; 52; 62) is made of thermoplastic and has a peripheral welding surface (25) which extends transversely relative to the longitudinal axis of the filter (10), and at least the outermost complete turn (29) of one end of said end faces of the filter element (17) is sealingly welded to the welding surface (25) of the cover cap (18; 52; 62).

2. The improvement as defined in claim 1, wherein the cover cap (18; 52; 62) has a circumferential step (24), the welding surface (25) being arranged on the circumferential step (24).

3. The improvement as defined in claim 2, wherein the welding surface has a radial width and the radial width of the welding surface (25) corresponds at least to a thickness of two turns (29) of the filter element (17).

4. The improvement as defined in claim 2, wherein the cover cap (18; 52; 62) has a sleeve-like peripheral portion (26) having at an at least partially conical inner wall (27).

5. The improvement as defined in claim 4, wherein the inner wall (27) of the cover cap (16; 52; 62) is welded to an outer surface (31) of the filter element (17).

6. The improvement as defined in claim 2, wherein the cover cap (18; 62; 62) has an exterior surface (28) located opposite the welding surface (25).

7. The improvement as defined in claim 1, wherein the housing has a bottom member and the cover cap (18; 52; 62) is shaped to bear against the bottom member (37) of the housing (11) over a major portion of the bottom member.

8. The improvement as defined in claim 1, wherein the cover cap (18; 52; 62) has a plurality of radial ribs (33) supporting the adjacent end face (22) of the filter element (17).

9. The improvement as defined in claim 8, wherein the welding surface (25) and a plurality of top edges of the radial ribs (33) extend essentially in one plane.

10. The improvement as defined in claim 1, wherein the outlet connector (16) comprises an outer connector piece (39) of the housing, a central tubular connector piece (38) of said cover cap (18), said central tubular connector piece (38) of said cover cap (18) projecting into said outer connector piece (39), and a threaded nut (41) received in the tubular connector piece (38).

11. The improvement as defined in claim 1, wherein the housing (11) comprises a housing part (12) and a lid (51) closing the housing part (12) at one end of the housing (11), the two connectors (15, 16) being provided in the lid (51).

12. The improvement as defined in claim 11, wherein the cover cap (62) has a tubular extended part (63) forming a water storage space (61 and a plurality of radial ribs (33) located in the tubular extended part (63), said water storage space (61) being connected to a water outlet (64).

13. The improvement as defined in claim 1, further comprising a napped trap filter (72) arranged in the cover cap (71) level with the welding surface (25), an outer edge of the napped trap filter (72) being melted into the welding surface (25).

14. Process for making a fuel filter comprising a housing having an inlet connector and an outlet connector for a fluid to be filtered, a middle tube located in the housing, a filter element arranged in the housing, the filter element consisting of a band-shaped filter material wound spirally around the middle tube to form a plurality of complete turns including an outermost complete turn and also end faces of the filter element on opposite ends thereof, and a thermoplastic bottom cover cap, which engages the filter element and which has a peripheral welding surface (25) which extends transversely relative to the longitudinal axis of the filter (10), at least the outermost complete turn (29) of one of said end faces of the filter element (17) being sealingly welded to the welding surface (25) of the cover cap (18; 52; 62), said process including the steps of applying a heating punch (36) to the cover cap (18; 52; 62), partially melting the welding surface (25) with the heating punch, after said partially melting pressing the filter element (17) into the welding surface (25) and allowing the melting surface (25) to solidify to form a sealing connection with the filter element.

* * * * *